United States Patent
Crane et al.

(10) Patent No.: US 6,899,059 B1
(45) Date of Patent: May 31, 2005

(54) REFILLABLE CATNIP TOY

(76) Inventors: Samuel Crane, 19 Cedar La. North, Glen Head, NY (US) 11545; Charles Viola, 511 S. 2nd St., Fairfield, IA (US) 52556

( * ) Notice: Subject to any disclaimer, the term of this patent is extended or adjusted under 35 U.S.C. 154(b) by 85 days.

(21) Appl. No.: 10/260,862

(22) Filed: Sep. 27, 2002

Related U.S. Application Data

(63) Continuation-in-part of application No. 09/841,524, filed on Apr. 24, 2001, now abandoned.

(51) Int. Cl.$^7$ .......................................... A01K 29/00
(52) U.S. Cl. .................................................. 119/711
(58) Field of Search ..................... 119/702, 707, 709, 119/710, 711

(56) References Cited

U.S. PATENT DOCUMENTS

| | | | |
|---|---|---|---|
| 1,006,182 A | | 10/1911 | Cousin |
| 2,131,229 A | * | 9/1938 | McMennamin ............. 446/419 |
| 4,928,632 A | | 5/1990 | Gordon ..................... 119/29.5 |
| D308,557 S | | 6/1990 | Reese ......................... D21/163 |
| 5,191,856 A | * | 3/1993 | Gordon ....................... 119/711 |
| 5,269,256 A | | 12/1993 | Viola .......................... 119/707 |
| 5,275,127 A | | 1/1994 | Leopold ..................... 119/706 |
| D380,879 S | | 7/1997 | Hernandez ................. D30/160 |
| 5,682,838 A | | 11/1997 | Reich ......................... 119/711 |
| 5,947,061 A | * | 9/1999 | Markham et al. ........... 119/710 |
| 6,073,588 A | * | 6/2000 | McClung et al. ........... 119/709 |
| 6,158,391 A | * | 12/2000 | Simonetti ................... 119/707 |

* cited by examiner

Primary Examiner—Son T. Nguyen
(74) Attorney, Agent, or Firm—Keith Frantz

(57) ABSTRACT

A catnip-filled toy (10) which may be caused to roll, spin, rock, wobble, and slide when manipulated by the paw of a cat. The device (10) has a convex hub (12). Extending axially from the hub (I 2) are two hollow reservoirs (14) that may be filled with catnip (24). The convex hub (12) and catnip reservoirs (14) are circular in shape when seen in side elevation from an end view, so as to allow the device (10) to roll freely upon any smooth surface (30). The hub is larger in circumference than the reservoirs for continuous rolling of the toy on the hub. In the preferred embodiment of the device (10), the reservoirs (14) are elongated axially beyond a hemispherical shape. The catnip reservoirs (14) have openings (20) through which the catnip (24) may be filled, emptied, and refilled and have a plurality of small holes (22) through which the scent of the catnip (24) inside may emanate outside. The holes (22) are small enough to substantially contain finely cut catnip (24). The catnip reservoirs (14) are attached by screwing together a male threaded portion (26) and female threaded portion (28). The reservoirs may be detached by unscrewing the threaded portions (26, 28). In an alternative embodiment (110) only one of the reservoirs (114) is elongated axially beyond a hemispherical shape. Another alternative embodiment of the device (210) may include yarn, feathers, or other similar soft material (232) extending from, and attached to, the outer ends of the catnip reservoirs (214).

21 Claims, 3 Drawing Sheets

REFILLABLE CATNIP TOY

This application is a Continuation in Part of application Ser. No. 09/841,524, filed Apr. 24, 2001 now abandoned.

BACKGROUND OF THE INVENTION

1. Field of Invention

The disclosed invention is a novel catnip-filled toy for cats.

More particularly the invention relates to a catnip-filled toy that can be easily made to spin, rock, wobble, slide, and roll on a surface such as a smooth floor, that can be bitten and picked up by the cat, as well, and that may be easily refilled by the owner with fresh catnip.

2. Description of Prior Art

The scent of catnip has been shown to arouse and excite cats and increase their playfulness. Numerous toys exist that are filled with catnip; most of those catnip-filled toys being made of cloth that is stitched together and stuffed with catnip, in much the same manner as a pillow or a cushion is filled with soft material. While such catnip-filled toys may be clawed, bitten, batted, and carried around by cats, they do not allow the cat to effectively spin, rock, and roll the toy on the floor, and so their play value is thereby limited.

Catnip loses much of its scent over time and, as the scent fades, a catnip-filled toy will tend to become less attractive to a cat. Therefore it is of value to replace the old catnip with fresh catnip.

Catnip toys that are stitched together such as U.S. Pat. No. Des. 308,557 to Reese do not allow the owners to easily replace the old catnip with fresh catnip, as doing so would require cutting open the toys to remove the old catnip and then stitching them back together after filling them with fresh catnip.

U.S. Pat. No. 5,682,838 to Reich shows a cat toy which may be refilled more easily than other sewn catnip-filled toys due to the fact that it can be opened and closed using hook and loop fastening, however being made of soft fabric, it lacks a regular, hard molded outer surface that would allow the device to spin and roll easily and freely on a smooth surface when batted by the paw of a cat.

U.S. Pat. No. 4,928,632 to Gordon teaches a catnip-filled toy for cats that lacks the convex hub of the present invention and therefore is not well suited for spinning and cannot be moved in a rocking motion. In addition, Gordon's device does not allow easy refilling by the user with fresh catnip.

U.S. Pat. No. Des. 380,879 to Hernandez shows a weighted catnip-filled toy which may be moved in a rocking motion, but cannot be rolled across the floor.

U.S. Pat. No. 5,275,127 to Leopold shows a device that is mainly for scratching and clawing and cannot be moved about on the floor or picked up by the cat because it is mounted in place.

U.S. Pat. No. 1,006,182 to Cousin teaches a refillable catnip toy with an eccentrically located cavity that causes it to roll with an erratic motion.

U.S. Pat. No. 5,269,256 to Viola teaches a cat toy which can be effectively moved about on the floor by cats in a wide variety of play patterns, but it is cannot be filled with catnip.

SUMMARY OF THE INVENTION

The present invention represents a novel form of cat toy in that it comprises a catnip-filled amusement device that may be quickly and easily refilled with fresh catnip by the owner, that may be caused to spin, rock, roll, and slide about on a smooth surface such as a floor when manipulated by the paw of the cat and may also be bitten and picked up by the cat, and that can be moved about on a floor by cats in a wider variety of play patterns than other refillable catnip toys.

A touch of the cat's paw causes the device to spin in a lively manner which cats seem to find interesting. The unique shape of the toy allows it to slide, rock, and roll easily on a smooth surface such as a floor, providing amusement and exercise for the cat. In the preferred embodiment, the shape of the device allows the cat to easily bite it, pick it up or drag it around, providing further play possibilities for the cat.

A toy in accordance with the invention includes a hub and two reservoirs on opposite sides of the hub to hold catnip. The hub is circular in shape so as to allow the toy to roll freely as it rotates about its radial axis. The reservoirs are also radially circular in shape and share the same radial axis as the hub. The reservoirs extend axially in opposite directions from each other. The outer circumference of the hub is larger than that of the reservoirs. Consequently, the circumferential crown or largest circumference of the hub establishes the largest outer profile on the toy, and the remainder of the toy is contained within a cylindrical envelope that passes through this circumferential crown.

The two reservoirs may be filled with catnip and screwed together by means of the male screw threads of one reservoir engaging the female screw threads of the other reservoir. The reservoirs may be unscrewed and pulled apart to empty the old catnip and refill them with fresh catnip. The device should be molded of a material that is rigid enough to prevent the device from flexing or deforming to the extent that the screw threads become disengaged, resulting in the two reservoirs separating from each other and thereby possibly spilling the contents out from the reservoirs.

The reservoirs of the toy are elongated in shape, extending axially beyond a hemispherical shape. Such elongated reservoirs provide a means for the pet to cause the toy to spin, rock, wiggle, and wobble, because they make the weight of the toy less stable than if the toy had hemispherical reservoirs and also because the elongated reservoirs provide handles or means whereby the pet may easily manipulate the toy with its paws. If the reservoirs of the toy were both hemispherical in shape, the motion of the toy would be entirely different, disallowing play possibilities that involve motions such as rocking, wiggling, or wobbling.

In addition, the shape of the reservoirs, being elongated and narrower in outer circumference than the hub, allows the pet to more easily bite or grab the toy with its mouth than if the toy were spherical in shape.

The toy may be caused to tilt so that both the hub and one of the reservoirs are in contact simultaneously with the playing surface upon which the toy is being rolled. Because the circumference of the hub is larger than that of the reservoirs the hub portion of the toy will cover more ground, as the toy rolls, than will the reservoir portion, thereby causing the toy to roll in a circular path around the point of the reservoir that is in contact with the playing surface. If the toy is tilted so that the opposite reservoir is in contact with the playing surface, it will roll in an opposite circular path. Therefore the toy can be made to move in various unusual paths as the pet rocks the reservoirs back and forth while rolling the toy. When only the hub is in contact with the playing surface, the toy will tend to roll in a substantially straight path if pushed or pulled at its axial center and it will tend to spin when pushed or pulled at its peripheries. Thereby the toy can be made to move in various interesting ways.

Additionally, as the toy spins, slides, wobbles, rocks, or rolls upon a surface, it may produce a faint scratching or pitter-patter sound, due to the reservoirs dropping in elevation and touching the surface. This pitter-patter or scratching sound may increase the interest of the pet.

It can be seen from the aforementioned descriptions that the elongated reservoirs allow the toy to have a wide range of play possibilities. Therefore shape of the toy serves a useful function that is integral to the action of the toy.

The reservoirs may be filled with catnip and the scent of that catnip may escape through the holes in the reservoirs. The scent of the catnip emanating from the holes in the reservoirs provides a strong attraction for the cat and induces the cat to play with the toy. The holes should be small enough in size to substantially contain finely cut catnip within the reservoirs.

An alternative embodiment may be contemplated in which only one of the reservoirs is elongated axially beyond a hemispherical shape. In such a case, the toy would display many of the same advantages as found in the preferred embodiment, but its motion would be more erratic due to the fact that its weight would not be balanced. Such an erratic motion may add an element of interest as the pet plays with the device.

Another embodiment may be contemplated in which the device may include yarn, feathers, pom-poms, or other soft or flexible materials extending from, and attached to, the outer ends of the catnip reservoirs, as an aid in allowing the cat to bite or grab the device.

Figure 1:
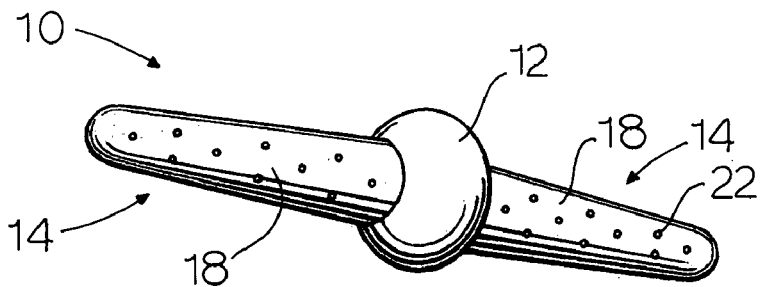
FIG. 1 shows a perspective view of a catnip-filled toy in accordance with the invention for pets.
Figure 2:
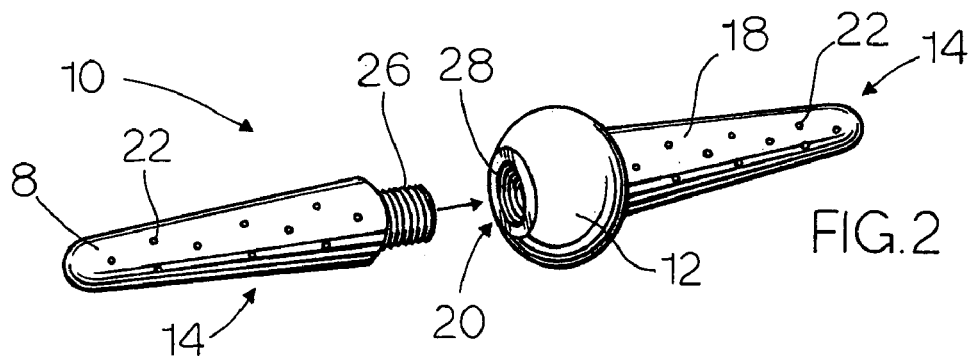
FIG. 2 shows an exploded perspective view thereof.

Reference numerals in the drawings correspond to items shown in the drawings as follows:
10 toy device
12 hub
14 catnip reservoir
16 inside of reservoir
18 outside of reservoir
20 opening of reservoir
22 holes
24 catnip
26 male threaded portion
28 female threaded portion
30 surface upon which the device may be used
32 circumferential crown of hub
34 cylindrical envelope of toy
110 first alternative embodiment of device
112 hub of first alternative embodiment
114A elongated catnip reservoir of first alternative embodiment
114B truncated catnip reservoir of first alternative embodiment
118 outside of reservoir of first alternative embodiment
122 holes of first alternative embodiment
124 circumferential crown of first alternative embodiment
210 second alternative embodiment of device
212 hub of second alternative embodiment
214 catnip reservoir of second alternative embodiment
216 inside of reservoir of second alternative embodiment
218 outside of reservoir of second alternative embodiment
220 circumferential crown of second alternative embodiment
222 holes of second alternative embodiment
226 male threaded portion of second alternative embodiment
228 female threaded portion of second alternative embodiment
232 yarn
234 knot
236 hole on outside end of catnip reservoir of second alternative embodiment

DETAILED DESCRIPTION OF THE INVENTION

The toy device 10 comprises a convex hub 12 from which radiate axially two reservoirs 14 to substantially closed outer ends, each reservoir establishing a cavity to hold catnip and having holes 22 through which the scent of the catnip 24 may be dispersed into the air. Both reservoirs 14 are radially circular so as to allow the device 10 to roll freely with its outer circumference in contact with the floor or other surface 30 upon which it is being used. In the preferred embodiment, both reservoirs 14 are elongated so that they extend axially beyond a hemispherical shape. Such elongated reservoirs 14 allow the toy 10 to wobble, wiggle, or rock when manipulated by the pet, therefore making its motion more lively and interesting to the pet. In addition, the elongated reservoirs 14 provide a means to spin the toy 10 around as the pet bats the reservoirs 14 with its paw.

The owner may fill the inside 16 of each reservoir 14 with catnip 24 by inserting the catnip through the openings 20 of the reservoir that provide threaded access thereto, and that are exposed when the reservoirs are unthreaded from one another. The device 10, thus filled with catnip 24, may then be assembled by screwing the male 26 and female 28 threaded portions together until the two parts of the device 10 are firmly connected. The threaded portions 26, 28 are radially circular so as to allow them to be connected and disconnected by rotating the male threaded portion 26 within the female threaded portion 28.

The scent of the catnip 24 emanates through the holes 22 in the reservoirs 14 into the surrounding air. The device 10 may be refilled with fresh catnip 24 by unscrewing the male 26 and female 28 threaded portions, emptying the old catnip 24 from the reservoirs 14 through the openings 20, refilling with fresh catnip 24 through said openings 20 and screwing the male 26 and female 28 threaded portions together firmly.

The hub 12 is convex in shape so as to minimize contact with the surface 30 upon which it is positioned and is larger in diameter and circumference than the outside 18 of the reservoirs 14, thereby allowing the device 10 to rock, roll, wobble, and spin freely when set in motion on the surface 30 by the paw of the cat. The hub 12 is radially circular so as to allow the toy to roll freely when it rotates about its radial axis.

Figure 3:
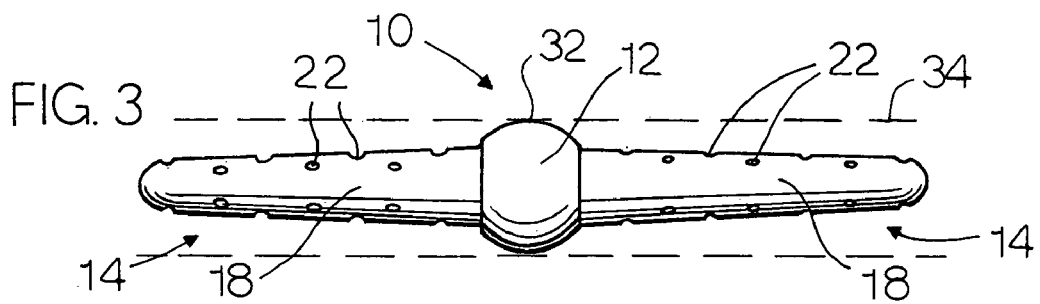
FIG. 3 shows a top plan view thereof.
Figure 4:
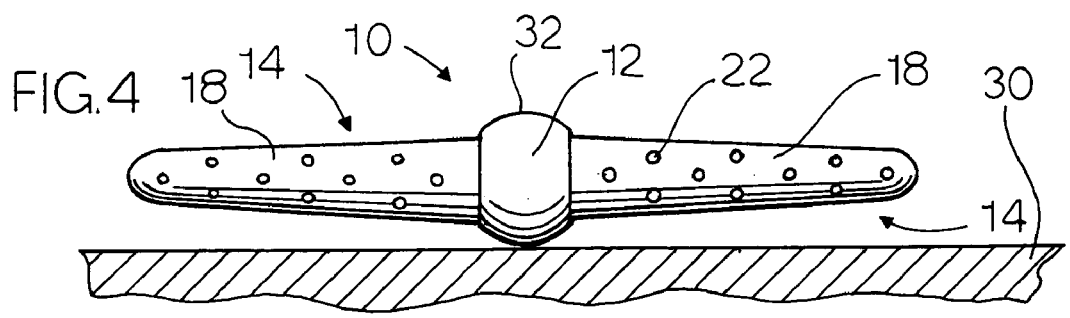
FIG. 4 shows a side elevational view thereof.
Figure 5:
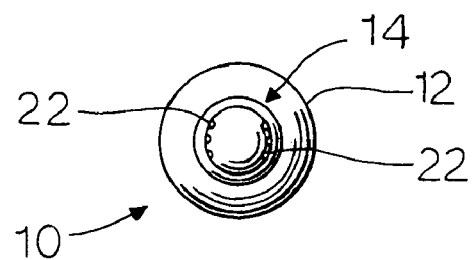
FIG. 5 shows an end view thereof.
Figure 6:
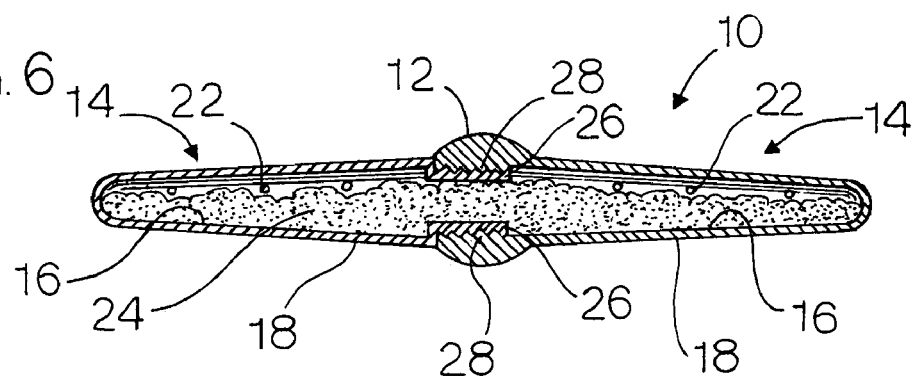
FIG. 6 shows a side elevational view thereof in cross-section.
Figure 7:
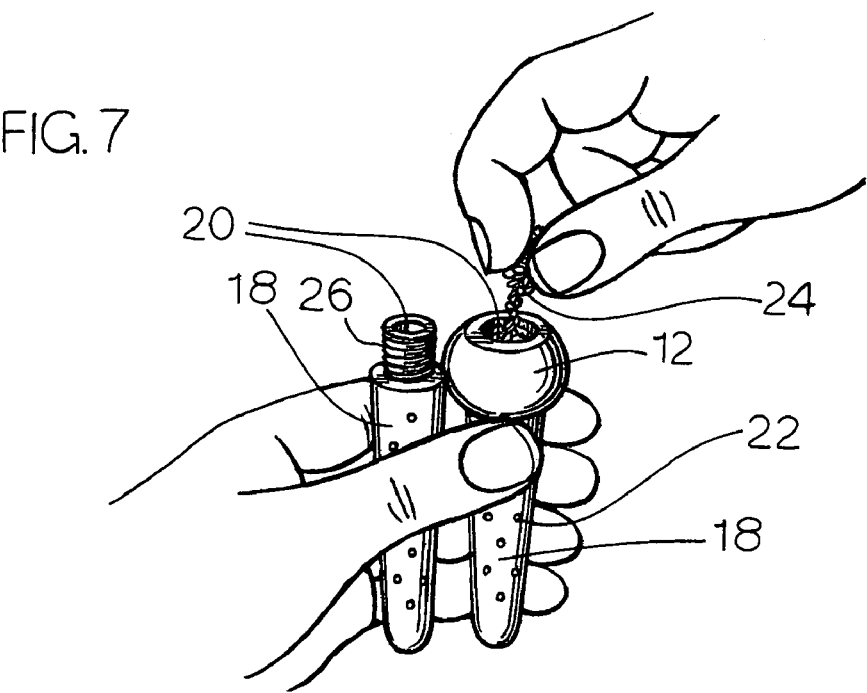
FIG. 7 shows the invention being filled with catnip.

Because the hub 12 and outside 18 of the reservoirs 14 have a circular or rounded shape, when viewed from the end in side elevation, they allow the device 10 to roll freely when pushed along the surface 30 upon which it is being used. This freely rolling contact between the hub and the play surface results directly from the circumferential crown 32 of the hub being the largest profile of the toy, and the reservoirs, as well as the remainder of the toy, being contained entirely within a cylindrical envelope 34 that passes through the circumferential crown, and that is shown in FIG. 3 extending parallel to the axis of the hub.

Figure 8:
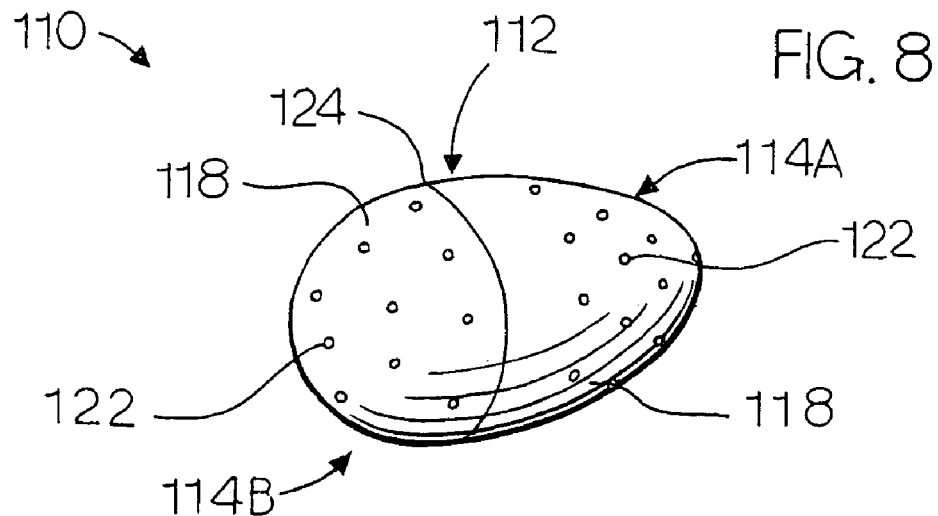
FIG. 8 shows a perspective view of an alternative embodiment of the invention.

In the preferred embodiment, the catnip reservoirs 14 are equal to each other in size and shape, extend coaxial with the hub 12 to establish coaxial cavities, are generally symmetric on opposite sides of the hub, and generally decrease in circular size upon progressing towards the outer ends. In an alternative embodiment 110, only one reservoir 114A is axially elongated beyond a hemispherical shape in order to make the device 110 move in an unbalanced manner and therefore erratic. FIG. 8 shows the alternative embodiment device 110 in which one of the catnip reservoirs 114A is elongated and the other reservoir 114B is more truncated than that of the preferred embodiment 10 and the central hub 112 is less distinctly separate from the catnip reservoirs. Additional components of this alternate embodiment device indicated in FIG. 8 include the reservoir outsides 118 associated with the detachable reservoirs, holes 122 in the reservoirs through which the scent of catnip may emanate, and the circumferential crown 124 of the hub 112.

Alternative embodiments may be contemplated wherein the device differs in shape from the preferred embodiment, yet the function of the device is essentially the same.

Figure 9:
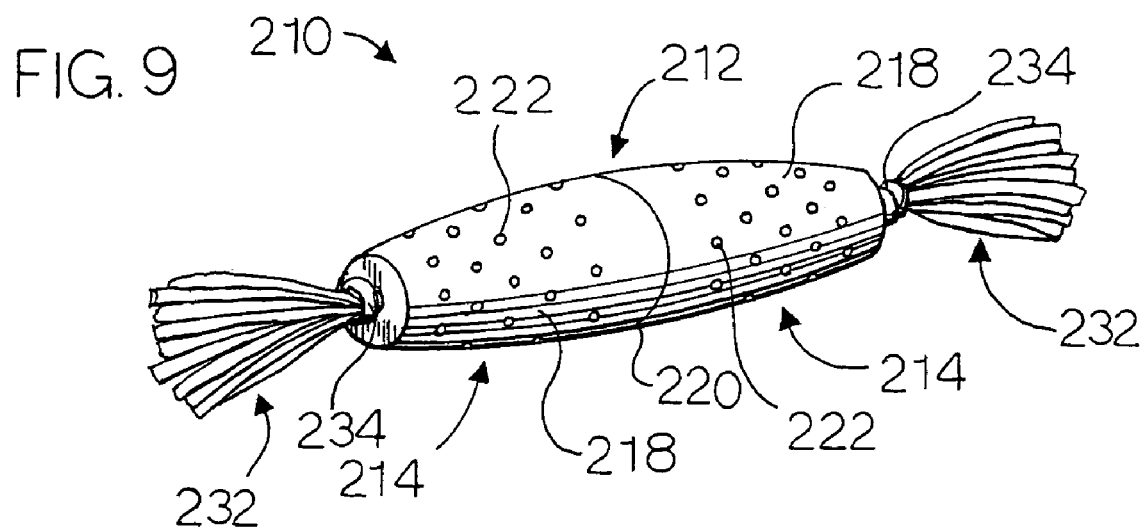
FIG. 9 shows a perspective view of a second alternative embodiment.
Figure 10:
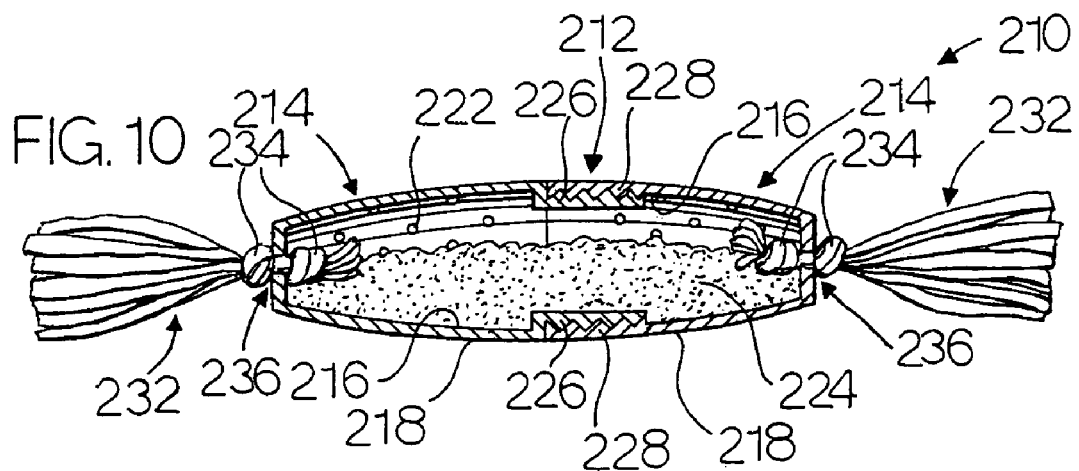
FIG. 10 shows a side elevational view thereof in cross-section.

FIGS. 9 and 10 show a second alternative embodiment of the device 210 which includes yarn or other stranded material such as mylar strips 232 attached to and extending outwardly from the outer ends of the catnip reservoirs 214 to allow the cat to better grab or bite the device 210 and to allow additional play value. The yarn or stranded material may be attached by tying it in a knot 234 and pulling the loose ends through a hole 236 in the outer end of the catnip reservoir 214 and securing the yarn or stranded material with another knot 234. As with the previously described embodiments, this alternate embodiment includes a central convex hub 212 with a circumferential crown 220, reservoir insides 216, reservoir outsides 218, small holes 222 through the sides of the reservoirs, and male 226 and female 228 threaded portions for opening and closing the toy.

SUMMARY, RAMIFICATIONS, AND SCOPE

Disclosed herein is a unique catnip-filled toy that allows a wide range of play patterns for the cat and allows quick and easy refilling with catnip by the owner. Although the present invention is primarily intended for use by cats, it may made in various sizes and filled with various substances other than catnip, such as dried pet food so as to be used in a similar manner by other pet animals such as ferrets, dogs, or birds.

Various embodiments of the disclosed invention may be contemplated. As indicated in FIGS. 8–10, the shape may vary from the preferred embodiment, without changing the nature and function of the invention. Therefore, the scope of the invention should be determined by the appended claims and legal equivalents, and is not limited to the illustrations or examples provided.

What is claimed is:

1. A toy for pets comprising:
   a) a convex hub that is circular about a central axis so that it may roll on a smooth surface, and
   b) two reservoirs that are circular about a central axis so that they may roll on a smooth surface,
   c) said reservoirs extending axially in opposite directions from said hub along a common radial axis,
   d) at least one of said reservoirs extending axially elongated beyond a hemispherical shape,
   e) said hub having a circumferential crown larger in circumference than said reservoirs and establishing the largest outer profile of the toy such that the reservoirs are contained entirely within a cylindrical space established by an imaginary cylindrical envelope extending through the circumferential crown, and spaced entirely inwardly from the cylindrical envelope to permit raising, lowering, wobbling or tilting of the reservoirs as the toy rolls on the hub along the, surface,
   f) said reservoirs having an inner cavity that may be filled with catnip,
   g) said reservoirs having a plurality of holes through which the scent of catnip may emanate,
   h) said holes being small enough to substantially contain finely cut catnip,
   i) each reservoir having an opening through which catnip may be inserted into the reservoir or removed from the reservoir,
   j) said reservoirs being detachably connected in fixed relation through the hub to each other by means of screw threads.

2. The toy as defined in claim 1 in which the reservoirs extend coaxial with the hub.

3. The toy as defined in claim 1 in which the cavities are formed coaxial with the hub.

4. The toy as defined in claim 1 in which the reservoirs extend generally symmetric about the hub.

5. The toy as defined in claim 1 in which the reservoirs have outer ends opposite the hub and decrease in circular size upon progressing from the hub towards the outer ends.

6. The toy as defined in claim 1 in which the cylindrical envelope extends coaxial with the hub.

7. The toy as defined in claim 1 in which the hub and said one reservoir are shaped to cause the toy to roll in a circular path upon simultaneous rolling contact with a horizontal surface.

8. The toy as defined in claim 1 in which the hub is formed integrally with one of the reservoirs.

9. A toy for pets comprising:
   a) a convex hub that is circular about a center axis so that it may roll on a smooth surface,
   b) two reservoirs extending from the hub to substantially closed outer ends having radially outer circular profiles so that they may roll on a smooth surface, the reservoirs,
   c) threaded access to openings to each of the reservoirs for inserting catnip into the reservoirs, and
   d) a plurality of holes in the sides of the reservoirs through which the scent of catnip may emanate, the holes being sized to substantially contain finely cut catnip in the reservoirs,
   e) at least one of the reservoirs being elongated beyond a hemispherical shape,
   f) the hub having a circumferential crown that is the single largest outer profile of the toy such that the reservoirs including the outer ends are contained entirely within a cylindrical space established by an imaginary cylindrical envelope extending through the circumferential crown, and spaced entirely inwardly from the cylindrical envelope to permit raising, lowering, wobbling or tilting of the reservoirs as the toy rolls on the hub along the surface.

10. The toy as defined in claim 9 in which the reservoirs extend coaxial with the hub in opposite directions.

11. The toy as defined in claim 9 in which the reservoirs extend generally symmetric about the hub.

12. The toy as defined in claim 9 in which the reservoirs decrease in circular size upon progressing towards the outer ends.

13. The toy as defined in claim 9 in which the cylindrical envelope extends coaxial with the hub.

14. The toy as defined in claim 9 in which the hub and said one reservoir are shaped to cause the toy to roll in a circular path upon simultaneous rolling contact with a horizontal surface.

15. The toy as defined in claim 9 in which the reservoirs are threaded together, and said access opening is exposed when the reservoirs are unthreaded from one another.

16. The toy as defined in claim 9 in which the hub is formed integrally with one of the reservoirs.

17. A toy for pets comprising:
a) a convex hub that is circular about a center axis so that it may roll on a smooth surface, and
b) two reservoirs releasably connected in fixed relation through the hub to each other and extending coaxially in opposite directions from the hub, the reservoirs having
   i) outer ends with outer circular profiles so that they may roll on a smooth surface,
   ii) openings that are exposed only when the reservoirs are disconnected from one another to enable inserting catnip into the reservoirs, and
   iii) a plurality of holes through which the scent of catnip may emanate, the holes being sized to substantially contain finely cut catnip in the reservoirs,
c) at least one of the reservoirs being elongated beyond a hemispherical shape, and
d) the hub having a circumferential crown that is the single largest outer profile of the toy such that the remainder of the toy is contained entirely within a cylindrical space established by an imaginary cylindrical envelope extending through the circumferential crown, and spaced entirely inwardly from the cylindrical envelope to permit raising, lowering, wobbling or tilting of the reservoirs as the toy rolls on the hub along the surface.

18. The toy as defined in claim 17 in which the reservoirs extend coaxial with and generally symmetric about the hub.

19. The toy as defined in claim 18 in which the cylindrical envelope extends coaxial with the hub.

20. The toy as defined in claim 19 in which the reservoirs decrease in circular size upon progressing from the hub towards the outer ends, and are shaped to cause the toy to roll in a circular path upon simultaneous rolling contact between the hub and one of the reservoirs with a horizontal surface.

21. The toy as defined in claim 17 in which the hub is formed integrally with one of the reservoirs.

* * * * *